3 Sheets—Sheet 1.

I. A. & C. I. WILLIAMS.

LOCOMOTIVE HEAD LIGHT WITH SIGNAL ATTACHMENT.

No. 10,751. Reissued July 27, 1886.

*Witnesses:*
J. S. Theo. Lang
Robt L. Fenwick

*Inventors:*
Irvin A. Williams
Charles I. Williams
by their attys
Fenwick & Lemmer 3 Sheets—Sheet 2.

I. A. & C. I. WILLIAMS.

LOCOMOTIVE HEAD LIGHT WITH SIGNAL ATTACHMENT.

No. 10,751. Reissued July 27, 1886.

*Witnesses:*

J. P. Theo. Lang

Robt. L. Fenwick

*Inventors:*

Irvin A. Williams

Charles I. Williams by their attys

Fenwick and Lawrence

I. A. & C. I. WILLIAMS.

LOCOMOTIVE HEAD LIGHT WITH SIGNAL ATTACHMENT.

No. 10,751. Reissued July 27, 1386.

*Witnesses:*
J. P. Thos. Long
Robt. L. Fenwick

*Inventors:*
Irvin A. Williams
Charles I. Williams
by their atty
Fenwick & Hammer

UNITED STATES PATENT OFFICE.

IRVIN A. WILLIAMS AND CHARLES I. WILLIAMS, OF UTICA, NEW YORK.

LOCOMOTIVE HEAD-LIGHT WITH SIGNAL ATTACHMENT.

SPECIFICATION forming part of Reissued Letters Patent No. 10,751, dated July 27, 1886.

Original No. 281,327, dated July 17, 1883. Application for reissue filed May 7, 1884. Serial No. 130,701.

*To all whom it may concern.*

Be it known that we, IRVIN A. WILLIAMS and CHARLES I. WILLIAMS, citizens of the United States, residing at Utica, in the county of Oneida and State of New York, have invented a new and Improved Locomotive Head-Light with Signal or Indicator Attachment, of which the following is a specification.

Our invention relates to an improved locomotive head-light, whereby the reflected rays of light from the reflector and burner are secured and utilized within the head-light case for illuminating signals, indicators, or a plate or plates of transparent or light-transmitting material, displaying a sign, index, name, or number, or illuminating and displaying a number or name or color for signal purposes; and our invention consists in certain novel constructions, combinations, and arrangements of parts in a locomotive head-light for either signaling or indicating purposes, or for both signaling and indicating, and for illuminating or lighting the track, as will be hereinafter described and specifically claimed.

The object of our invention, or several novel features of construction, is to furnish a head-light with night displaying-signals, which signals will show either the number or name of the engine or number of the train, or other signal of the train, in a very distinct manner, and greatly facilitate the running of night-trains and aid the employés, train-dispatchers, and operators in telegraph and block-signal offices to locate and designate the train or section of train passing, also enable the engineer on an approaching train or an engineer with his train on a "siding" to know what train, section of a train, or engine is passing.

Figure 1:
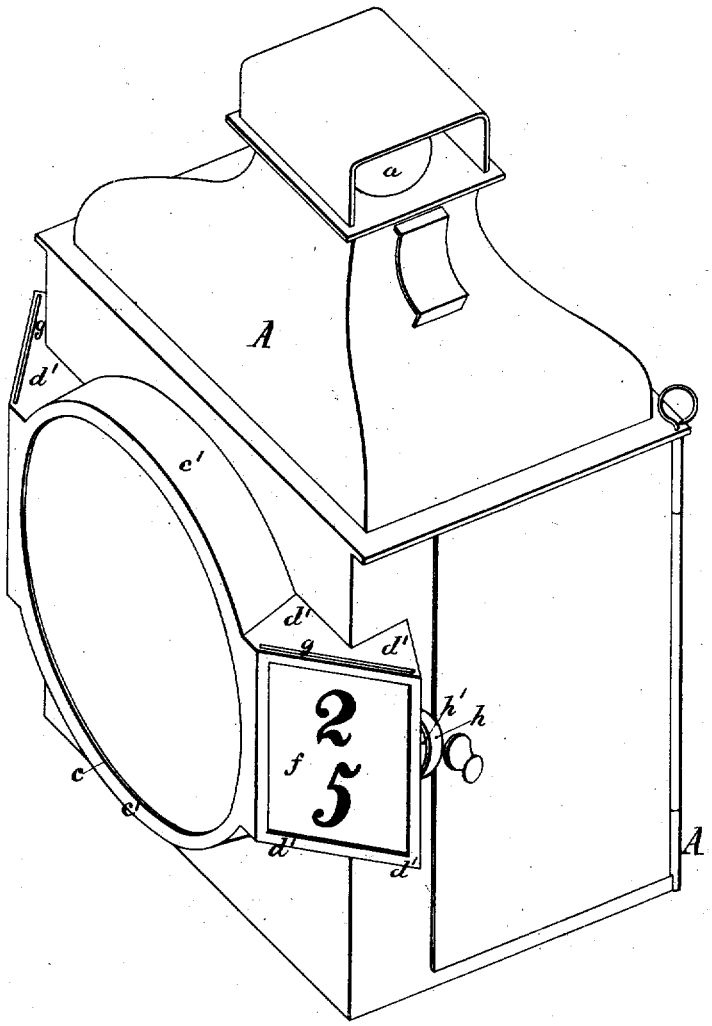
Figure 2:
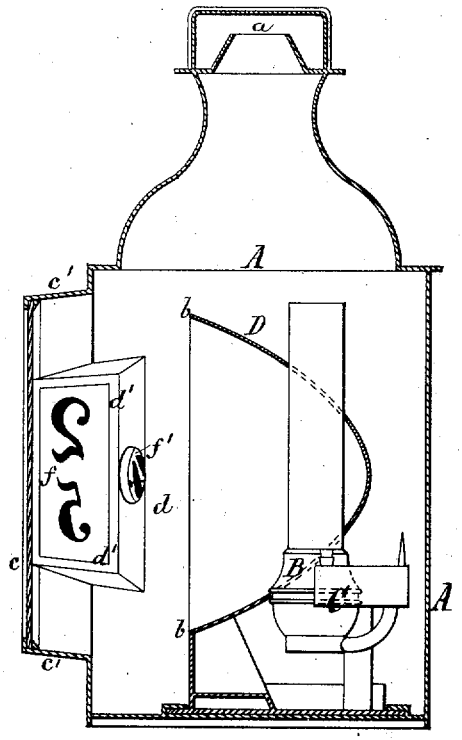

In the accompanying drawings, Figure 1 is a perspective view of our improved locomotive head-light with signal or indicator attachment. Fig. 2 is a vertical longitudinal section, and Fig. 3 a horizontal section, of the same. Fig. 4 is a broken detail vertical section of one of the sides of the illumination-chamber, showing the construction whereby one signal-plate can be slipped out of its place and another substituted therefor, or plates displaying different numbers or names or colors may be used interchangeably.

Similar letters of reference in the several figures indicate corresponding parts.

In the accompanying drawings, A represents a head-light or deflector-case, provided, as usual, with one or more doors and a ventilation and smoke passage, *a*. Within this case an ordinary burner, B, with oil-supplying reservoir C, is applied in an approved manner, and in the usual or any proper relation to this burner an ordinary reflector, D, of parabolic form or other suitable form, is provided. These parts, as described, may be of any proper known construction, and so far as the burner and reflector and that part of the case A in rear of the front edge or flange of the reflector are concerned our invention does not relate to the same, but comprises the hereinafter-described improvement for use in conjunction with any head-light to which it may be applicable.

Figure 3:
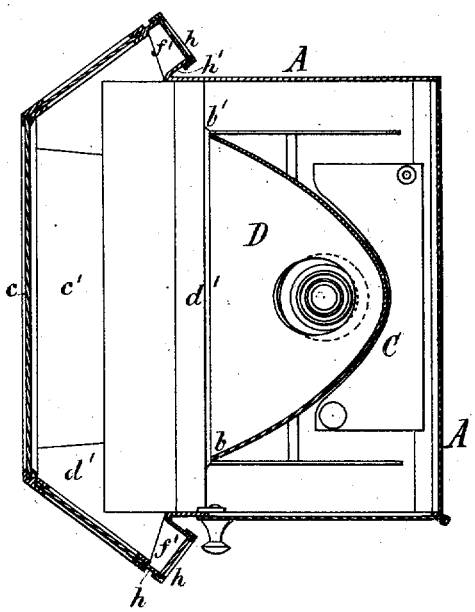
Figure 4:
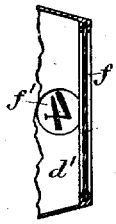

Forward of the reflector D, between the front edge or flange, *b*, thereof and the usual large illumination-opening, *c*, of the case A, we form a signal illumination-chamber, *d*, of greater size than the space which is usually left between these points, and on one or both (preferably both) of the vertical corners, or on the front top portion of the case A, we construct frame-like projections *d'*, of the form shown in horizontal section, in Fig. 3, or of any other suitable equivalent form. These projections may unite with parts of the circular projection *c'*, which is usually around the opening *c*, and within which the large circular plate of glass is placed; or they may not so unite with the said circular projection, but be fastened to the front of the case outside said projection, and therefrom extended back a short distance and united with the sides of the said case; but by preference we make them as described and shown. By forming these projections as shown portions of the circular projection *c'* and of the case A are cut away, and a signal illumination-chamber, *d*, extending from one projection to the other, is formed, said chamber being between the top and bottom and side edges of the projections *d'*. These projections *d'* present a partially front oblique side and a partially back oblique side. Those portions of the projections which stand partially fronting the head-light case are respectively provided with a rectangular or other shaped transparent plate, *f*, of colored glass or other light-transmitting device, and upon this plate the name or number of an engine or the number or name of a train of cars is placed in any well-known manner when the signals are used as indicators for showing the number of the engine or number of the train; or these plates may be simply different colored glass or other transparent material, and may be employed as danger-signals or for designating the sections of a train, in which case they will be without numbers or letters upon the plates. The plates *f* are thus arranged in order that the numbers or names or colors may, by the reflection of light from the reflector and burner, be readily seen and noted, and those portions of the projections which face partially rearward may be provided with a circular or other shaped plate, *f'*, of transparent material, colored glass, or other transparent or light-transmitting device or indicator. On this plate the number of an engine or a train or the name of such engine or train may be marked or inscribed in any well-known manner, in order that by the reflection of the rays of light from the reflector and burner it may be readily seen and noted. The plates *f'*, the same as plates *f*, may be simply different colored glass or equivalent device when used as danger-signals or for designating a section of a train.

In order to have the signal-plates of glass or other material interchangeable, we may place them within the projections *d'* in such a manner that they may be slid in and out through openings in the top portions of said projections, which construction is illustrated at *g* in Figs. 1 and 4 of the drawings, the plates in these views of the drawings being shown fitted in guideways of the projections and extending up through insertion and withdrawal openings in the tops of the projections.

Instead of the construction shown in Fig. 4, the plates may be fitted in detachable frames, similar to those shown at *h* for the round plates in Fig. 3, and these frames may be fitted over collars *h'* of the projections, and thus constructed the plates may be used interchangeably.

For different trains different numbers or names can be adopted by the engineer, carrying different-numbered signals with him on the engine, and for danger-signals and signaling sections of a train different colors can in like manner be carried and adopted by the engineer or manager. When the number of the engine is "25," that number can be changed in case it should be desired to place the number of the train in front. Should the number of the train be placed on the front, then the number of the engine can be placed on the rear, and the two numbers used together, as illustrated, and, if desired, only one need be used. If "danger" is to be signaled, or a section of a train signaled, the numbered or lettered signals are removed and signals of colored glass or other material inserted in their places, which color-signals being well understood in railroading will indicate at once what is intended.

From an examination of the drawings, it will be seen that our construction of the illumination-chamber and the arrangement of the signals outside and forward of the front edge of the reflector, as well as outside the large glass opening at the front of the case A, will insure the illumination of the track by a very large reflector and front opening, and at the same time the most effective illumination of the signals, for the rays of light from the reflector will strike directly upon the signals as well as upon the front circular glass of the head-light case, and not interfere in the least with the intended effect of the light—that is, the direct rays of light will pass out in great volume and illuminate the track, while the reflected rays will pass into the chambers and illuminate the signals, and while this is the case the signals are located so as to be seen by a person whether in front, on the side, or in the rear of the head-light.

The essential features of invention in our within-described signaling head-light are, first, the manner of lighting the signals, numbers, or names within frame-like projections, which hold the signals, numbers, or names at such an angle or in such a position as to cause them to receive the rays of light directly from the front of the reflector, or by the deflection of these rays sidewise, thereby insuring a brilliant illumination at all times when the lamp is lighted, or a sufficiently full illumination of the signals or names or numbers, even when the least light is afforded from the burner and reflector, inasmuch as such light is employed in a very direct manner and without necessitating the diminishment of the diameter of the circular glass, through which the light passes to light up the track; second, in the location of the numbers or the plates on the head-light, they being so placed as to enable the station-agent or telegraph-operator and others to read them "dead-ahead" of the engine, and also while the train is approaching or passing a station or passing another train or a train on a side track, they can be seen for nearly half-way round from the front, thus insuring the agent or operator abundance of time to get the numbers and compare them before and while the engine is passing, and thus to avoid mistakes, whereas in other methods they can only be seen from the side when the engine is in front of or alongside the person whose duty it is to learn the numbers of said engine, and who is able, on account of this position, to receive only a hasty glance of them when the train is under full speed, and hence mistakes are liable to occur; and, third, the constructions of the frame-like projections, which hold the numbers or signals, is such that, if desired, the number of the train, the name of the engine, or a signal may be shown, and such signal or number or name may be seen from the rear of the head-light or from the side of the engine, or from the front of the same.

A signal or a number or a name or a combination of a number and name, or of signal and number or name illuminated by means as described insures great safety and convenience, and a signal or a number or a name illuminated by means as described and seen from the rear of an engine or head-light affords a convenience not heretofore secured from a head-light signal. Besides this, different numbers or names or signals may be used, according to the number of the train or the kind of signaling to be performed—that is, the signals and their chambers are so constructed and arranged that the signals can be changed at will by the engineer, the interchangeable plates or some similar device enabling him to make the changes, and the positions of these train numbers, names, or signals being such that they can be readily seen while standing at right angles with the engine and during the passage of the entire train, as well as during the approach of the train or a section of a train.

We do not confine our invention to exhibiting an illuminated signal, name, or number at the rear of an illumination-chamber of a head-light or projections of said chamber, to the combination therewith of a forward signal or name. Neither do we confine our invention to exhibiting illuminated signals, names, or numbers at the rear and on the side and front of an illuminated chamber of a head-light to the exact form of the projection or projections. Neither do we confine our invention of the projections on the vertical side corners or horizontal front top corner of head-light case to the construction which allows of signals, names, or numbers being used in plurality within each projection, as we contemplate using a single name, number, or signal, instead of two, and to have the same forward of and outside the front edge or flange of the reflector and outside of the large front glass-covered opening of the head-light, and outside the chamber of the reflector or head-light case proper, and to illuminate such signal, name, or number by rays of light from the reflector and burner in the peculiar manner hereinbefore specified.

We desire it to be understood that whenever the words "longitudinal walls of the reflector-case" are used in this patent they are intended to refer to either the top, sides, or bottom of the locomotive head-light reflector-case.

What we claim as our invention, and desire to secure by Letters Patent, is—

1. The combination, in a locomotive head-light, of a reflector, a burner, and a reflector-case provided with a signaling or indicating chamber located forward of and outside the reflector, the space within the chamber communicating with the space within the reflector-case, and said chamber extending out beyond the longitudinal walls of the reflector-case, so as to increase the area of said case outside the said walls, forward of the reflector, and having a front signaling or indicating device, substantially as and for the purpose described.

2. The combination, in a locomotive head-light, of a reflector, a burner, and a reflector-case provided with a signaling or indicating chamber located forward of and outside the reflector, the space within the chamber communicating with the space within the reflector-case, and said chamber extending out beyond the longitudinal walls of the reflector-case, so as to increase the area of said case outside the said walls, forward of the reflector, and having a rear signaling or indicating device, substantially as and for the purpose described.

3. A locomotive head-light comprising a burner, a reflector, and a reflector-case having a signal or indicator illuminating-chamber extending diagonally across a front outside corner of the reflector-case forward of and outside of the front edge of the reflector and outside of the large front glass in the front of the reflector-case, said chamber being provided with a signaling or indicating device, whereby the light from the burner and front of the reflector can be utilized for illuminating the signal or indicator, substantially as described.

4. The combination, with a locomotive head-light, of a signaling or indicating chamber or device located on a front corner or corners thereof, said chamber or device being forward of the reflector and exposed to the light of the burner, substantially as and for the purpose described.

5. The combination, in a locomotive head-light, of a reflector, a burner, and reflector-case provided with a signaling or indicating chamber located forward of and outside the reflector, the space within the chamber communicating with the space within the reflector-case, and said chamber extending out beyond the longitudinal walls of the reflector-case, so as to increase the area of said case outside the said walls and forward of and outside the reflector, and having a front and a rear signaling or indicating device, substantially as and for the purpose described.

6. A locomotive head-light comprising a reflector, a burner, and a reflector-case having a large front glass, and provided with an illumination-chamber having a signaling or indicating device, said chamber being placed forward of and outside the front edge of the reflector and on the outside of the large front glass, and the front glass being as large as the full diameter of the front edge of the reflector, whereby the light from the reflector will not be interfered with while passing forward out of the reflector-case, substantially as and for the purpose described.

7. The combination, in a locomotive head-light, of a reflector, a burner, and a reflector-case provided with a large front glass and a signaling or indicating chamber attached to said case at one of its forward corners, that portion of the chamber containing the front signal or indicator extending along the front of the case to the front glass and rearward along a longitudinal wall of the case to a point which is forward of the reflector, and exposed to the light of the burner, substantially as and for the purpose described.

8. A head-light provided with a front glass, a reflector, a burner, and a signal or indicator chamber, which is in communication with the reflector-case at a point forward of the reflector, said chamber having a rear signal or indicator located in the rear of a line intersecting the burner and the front edge of the reflector, and said signal illuminated by light passed out of the front of the reflector, substantially as and for the purpose described.

IRVIN A. WILLIAMS.
CHARLES I. WILLIAMS.

Witnesses:
JAMES E. HALL,
BRADNER N. GOODRICH.